United States Patent [19]

Bates

[11] Patent Number: 5,286,967
[45] Date of Patent: Feb. 15, 1994

[54] METHOD AND APPARATUS FOR SELF-BIASING A LIGHT BEAM OBSTACLE DETECTOR WITH A BIAS LIGHT

[75] Inventor: Richard D. Bates, Ann Arbor, Mich.

[73] Assignee: Stanley Home Automation, Novi, Mich.

[21] Appl. No.: 985,961

[22] Filed: Dec. 4, 1992

[51] Int. Cl.⁵ .......................... G01J 1/32; H01J 40/14; G01V 9/04
[52] U.S. Cl. .................. 250/205; 250/214 B; 250/221; 340/556
[58] Field of Search ........ 250/214 B, 214 C, 214 AG, 250/205, 221, 222.1; 340/555-557

[56] References Cited

U.S. PATENT DOCUMENTS

| | | |
|---|---|---|
| 3,376,423 | 4/1968 | James . |
| 3,534,499 | 10/1970 | Chaffee . |
| 3,639,768 | 2/1972 | Mancini . |
| 3,770,968 | 11/1973 | Hession et al. . |
| 3,867,628 | 2/1975 | Brown ........................... 250/214 B |
| 3,911,268 | 10/1975 | Mori et al. . |
| 4,032,777 | 6/1977 | McCaleb . |
| 4,056,721 | 11/1977 | Chow et al. . |
| 4,074,143 | 2/1978 | Rokos . |
| 4,118,621 | 10/1978 | Monticelli et al. . |
| 4,292,514 | 9/1981 | Ohtomo . |
| 4,330,706 | 5/1982 | Lawenhaupt . |
| 4,341,956 | 7/1982 | Bax . |
| 4,516,019 | 5/1985 | Eertink et al. . |
| 4,521,681 | 6/1985 | Inaba et al. . |
| 4,556,791 | 12/1985 | Spillman, Jr. . |
| 4,588,883 | 5/1986 | Abbas . |
| 4,626,676 | 2/1986 | Gerardin . |
| 4,645,919 | 2/1987 | McCaleb . |
| 4,736,097 | 4/1988 | Philipp ........................... 250/214 B |
| 4,757,190 | 7/1988 | Ando et al. . |
| 4,945,225 | 7/1990 | Gamgee et al. ................. 250/214 B |
| 4,982,081 | 1/1991 | Schmidt . |
| 5,103,084 | 4/1992 | Williams et al. . |
| 5,180,907 | 1/1993 | Udden et al. ..................... 250/214 B |
| 5,191,268 | 3/1993 | Duhame . |

FOREIGN PATENT DOCUMENTS

| | | |
|---|---|---|
| 01-56631 | 6/1989 | Japan . |
| 02-68213 | 11/1990 | Japan ........................ 250/214 AG |
| 532016 | 10/1976 | U.S.S.R. . |

OTHER PUBLICATIONS

"Ideas for Design" AGC-controlled light-beam detector ignores ambient light changes vol. 20, No. 19, 1981; pp. 188-190.

*Primary Examiner*—Michael Messinger
*Attorney, Agent, or Firm*—Krass & Young

[57] ABSTRACT

A modulated light beam obstacle detector for use as a safety mechanism in an automatic closure operator which must operate in varying ambient light conditions. If the obstacle detector senses the interruption of the light beam, the motion of the door is arrested or reversed. The obstacle detector uses an auxiliary light source connected in a feedback circuit to maintain a constant background illumination on the light detector and thereby hold the light detector in conduction at all times. In this manner, the presence of the light beam can be sensed regardless of the ambient light conditions.

9 Claims, 2 Drawing Sheets

METHOD AND APPARATUS FOR SELF-BIASING A LIGHT BEAM OBSTACLE DETECTOR WITH A BIAS LIGHT

FIELD OF THE INVENTION

This invention relates to light beam detectors and, more particularly, to a method and apparatus for biasing light beam detectors with auxiliary light to compensate for varying ambient light conditions.

BACKGROUND OF THE INVENTION

It is often necessary, for reasons of safety and security, to know if an object, person, or animal is blocking a defined area. Automatic closure operators such as garage door openers must be able to detect the presence of any such obstruction in the path of the closure so that the motion of the closure can be arrested or reversed immediately. This feature prevents injury to people and animals and additionally prevents damage to property and to the closure operator itself.

There are several methods of sensing obstructions in the path of the closure. One method of performing this function involves utilizing a pressure sensitive strip along the leading edge of the door. In order to sense that an obstruction is in the path of the closure, the strip must first make physical contact with the obstruction with some minimum force. By the time that the pressure registers with the control mechanism and the motion of closure is stopped or reversed, substantial injury or damage could already have been incurred.

Another method of determining whether there is any obstruction in the path of a door is to provide a light source which projects a light beam across the doorway. A light detector is disposed opposite the light source to detect the light beam. When the light detector senses that the beam has been interrupted, the motion of the door is arrested or reversed. In some applications, especially in low power applications, the light beam is pulsed at some predetermined frequency to make it distinguishable from the ambient light conditions. The shortcoming of this method is that most semiconductor light detectors only respond to changes in light intensity within a narrow band. The light detectors have an inherent light intensity threshold below which they can not respond. Additionally, the light detector will saturate if the intensity of light received exceeds the light detector's saturation level. In both circumstances, the light detector would not sense the pulsed light beam from the light source, and the obstruction sensing feature of the closure operator would not function properly. It is toward the solution of this shortcoming that the present invention is directed.

SUMMARY OF THE INVENTION

This invention is a light beam obstacle detector which functions in any ambient light conditions for signalling the presence of an object, person, or animal in a defined area. The detector comprises a light beam transmitter, a light receiver, an auxiliary light source, and a closed loop circuit for modulating the intensity of the auxiliary light source.

The light beam transmitter, disposed adjacent to the defined area, emits a modulated light signal to be received by the light receiver which is also disposed adjacent to the defined area but opposite the light transmitter. The light receiver responds only to total incident light which is brighter than the lower threshold of the light receiver and less intense than the saturation level of the light receiver. The combined intensities of the maximum expected ambient light and the light signal must not be great enough to exceed the saturation level of the light receiver.

The auxiliary light source, under the control of the closed loop circuit, is disposed near the light receiver and directed toward the receiver so as not to obstruct the path of the modulated light beam. It compensates for variations in the ambient light intensity so that the intensity of the modulated light signal always falls within the operating range of the light receiver. When the ambient light intensity increases, the auxiliary light source is dimmed, and when the ambient light intensity decreases, the auxiliary light is brightened accordingly. In this way, the light beam can be detected by the light receiver under any ambient light conditions.

DETAILED DESCRIPTION OF THE INVENTION

Although the ensuing description is directed to a garage door safety feature, the system of this invention need not be limited to garage doors. Alternative embodiments are varied and range from security alarm systems for homes and businesses to proximity sensors for manufacturing.

Figure 1:
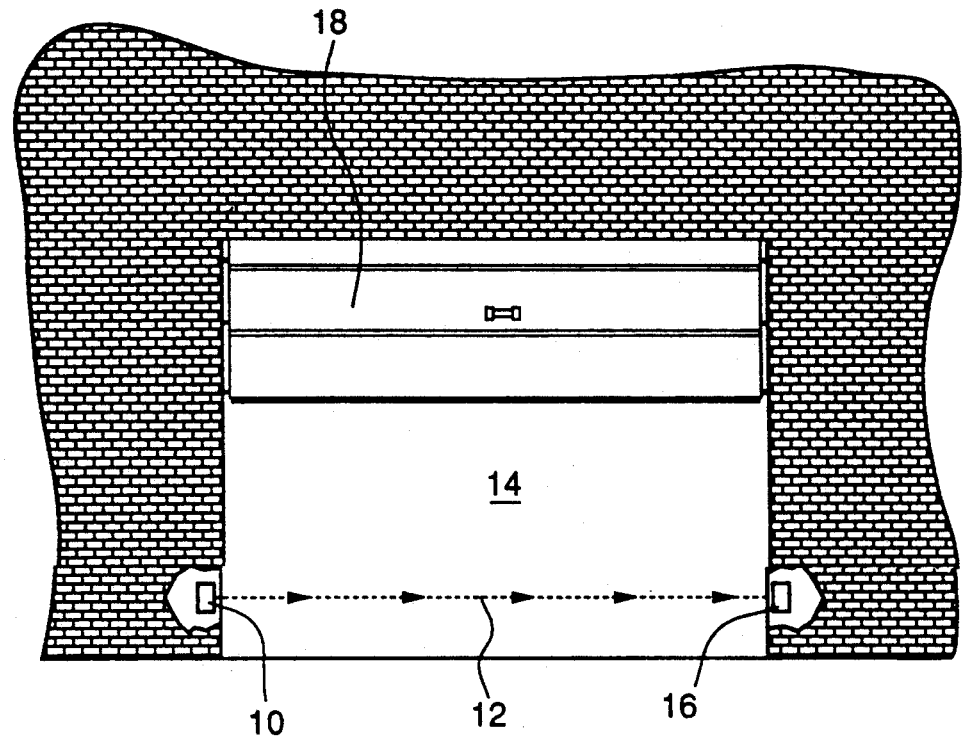
FIG. 1 is a front elevation view of a garage door opening showing the path of the modulated light signal with cutaways showing the light transmitter and receiver as configured in the preferred embodiment.

The invention is a light beam obstacle detector. In the preferred embodiment, the invention is used as a safety mechanism in conjunction with an automatic garage door operator as depicted in FIG. 1. A light beam transmitter 10 emits a pulsed light beam 12 across a garage door opening 14 to a light receiver 16. If, as the garage door 18 is closing, the light beam 12 is interrupted, then the motion of the door 18 is arrested or reversed. This is a safety feature to prevent injury to people or animals, damage to property, or damage to the garage door 18 itself.

The transmitter 10 and receiver 16 are shown immovably affixed near the bottom of the opening 14. This is so that even small children, animals, and objects will interrupt the pulsed light beam 12 and thus prevent the door 18 from closing until the path is clear. Alternatively, the hardware 10, 16 can be mounted at any height, depending upon the application. It would also be feasible to slidably mount the hardware 10, 16 so that it moves just ahead of the garage door 18. The distance ahead of the door 18 to be maintained by the sliding hardware 10, 16 would be determined by the speed of the door 18 and the time required to completely stop the door 18 after interruption of the pulsed light beam 12.

Figure 2:
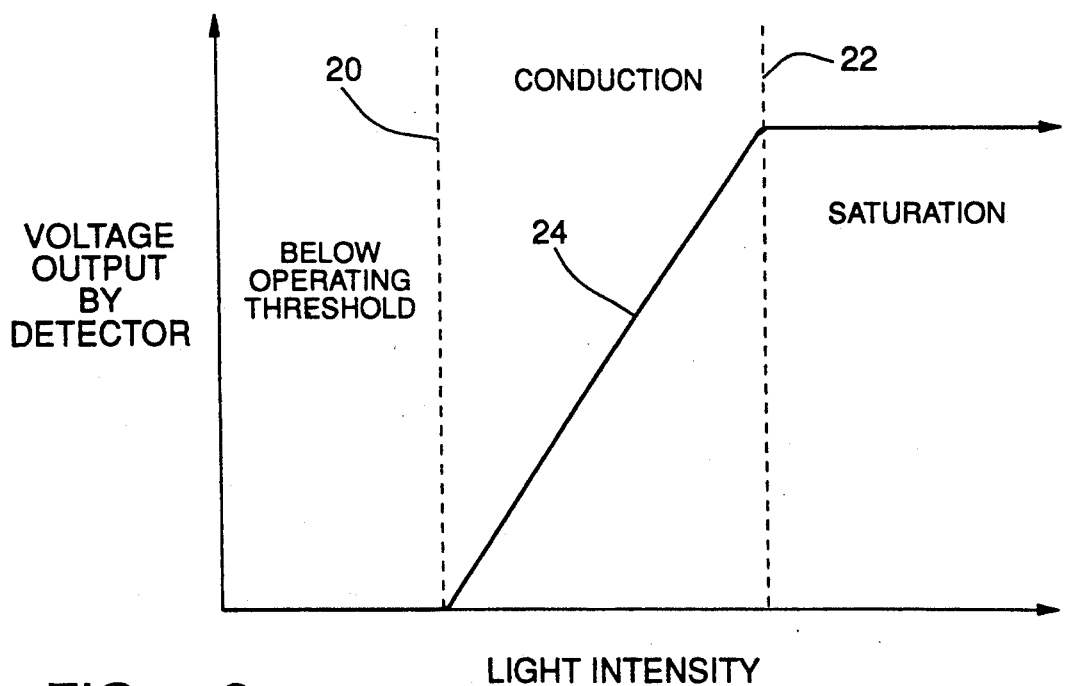
FIG. 2 is a graph depicting the relationship between input light intensity and output voltage for different modes of operation of a typical light detector.

FIG. 2 displays a graph of the voltage output by a typical light detector as it relates to the light intensity incident on the light detector. There are two thresholds of major importance to the proper operation of the light beam obstacle detector. The first is the operating threshold 20. At light intensities less than the operating threshold 20, no voltage is produced at the output of the light detector. The second is the saturation threshold 22. At incident light intensities greater than the saturation threshold, the voltage output is limited to a constant maximum. At light intensities between the saturation threshold 22 and the operating threshold 20, the light detector operates in a conduction region 24. The voltage produced at the output of the light detector is more or less linearly related to the intensity of the light incident on the light detector in the conduction region.

The modulated light signal 12 must fall in the conduction region 24 in order for the closure operator to be able to detect its presence, regardless of the ambient light conditions. If the modulated light signal lies only partially within the conduction region 24, then the signal will be attenuated and may not be detected by the circuitry of the closure operator.

Figure 3:
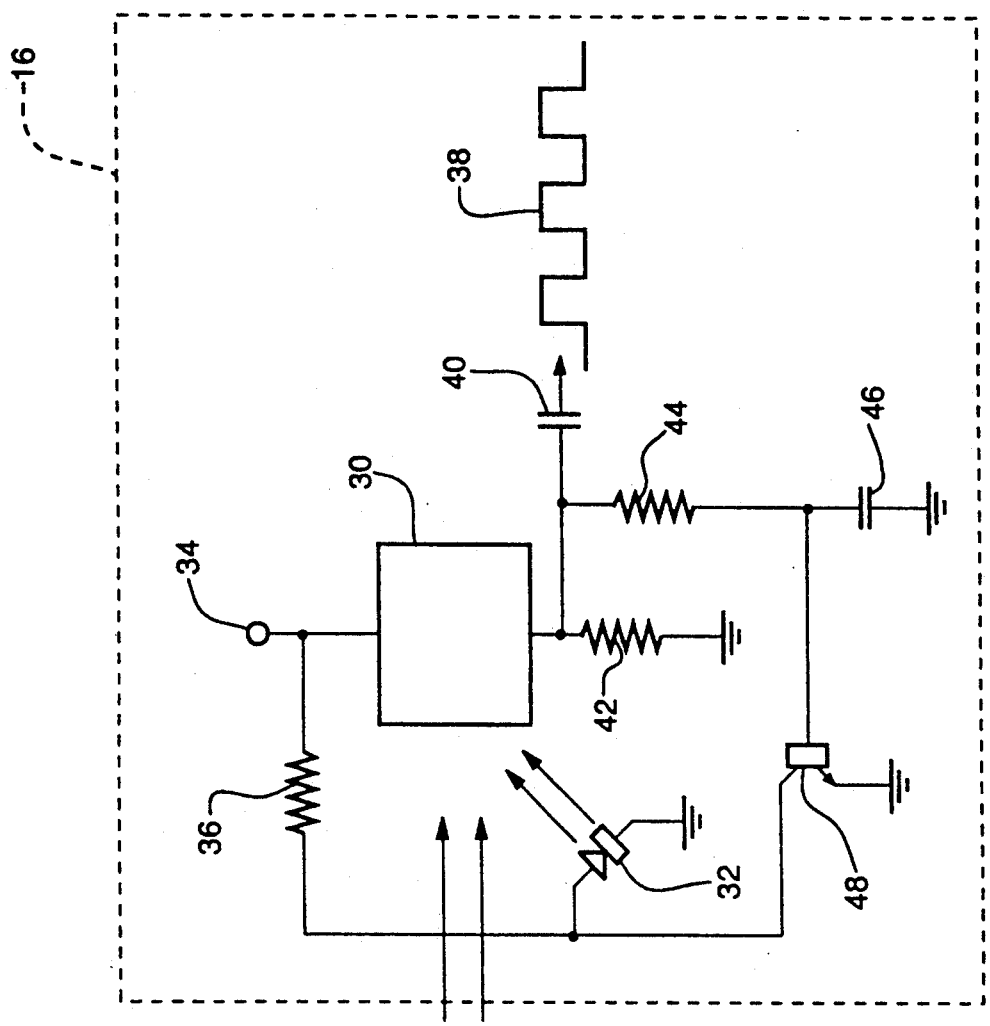
FIG. 3 is a circuit diagram showing the preferred embodiment of the light beam transmitter, receiver, auxiliary light source, and feedback circuitry.

FIG. 3 shows the circuitry that is used to detect the modulated light signal and compensate for variations in ambient light in the preferred embodiment. The system does not simply increase the intensity of the modulated light signal 12 by increasing the current through the light beam transmitter 10. This is because the transmitter 10 is a remotely positioned device, and increasing the intensity of the light beam 12 would require the transmission of additional power to the remote location. Rather, the level of light incident upon the light detector 30 of the receiver 16, apart from the modulated signal, is maintained at a constant intensity by supplementing the ambient light with an auxiliary light source 32. This approach requires that the light detector 30 used for a particular application be selected such that the maximum expected intensity of ambient light combined with the light beam 26 does not drive the light detector 30 into saturation.

The light beam signal transmitter 10 emits a light beam which has a specific wavelength and which is pulsed at a predetermined frequency. The specific methods of accomplishing this function are varied and commonly known in the art, and for this reason, will not be described here. The power required by the transmitter for operation is supplied through a power supply terminal 26.

The receiver 16 is comprised of a power supply terminal 34, a light detector 30 with a power input terminal and an output terminal, a current limiting resistor 36, an auxiliary light source 32 comprising a light emitting diode, a transistor 48, various resistors and capacitors serving as noise filters, and a signal output terminal 38. The power input terminal of the detector 30 connects to the power supply terminal 34 and the output of the detector connects to a voltage dividing resistor 42, the signal output filter 40, and the feedback loop. In the preferred embodiment, the signal output filter is a high pass filter which comprises a capacitor 40, but may alternatively be a band pass filter. The first component of the feedback loop is a low pass filter comprising a resistor 44 and a capacitor 46, which values are determined by the requirements of the design and by the characteristics of the other components used in the circuit. The base of the transistor 48 is connected to the output of the low pass filter. The emitter of the transistor 48 is grounded, while the collector has a node in common with the anode of the auxiliary light source 32 and the current limiting resistor 36, which in turn is connected to the power supply terminal 34. The cathode of the auxiliary light source 32 is grounded.

A positive voltage is applied at the power supply terminal 34. Current flows from the power supply terminal 34 through the resistor 36 and illuminates the auxiliary light source 32, which shines on the light detector 30 along with the modulated light beam 12 and the ambient light. The auxiliary light source 32 and the light beam transmitter 10 both radiate at the frequency to which the light detector 30 is sensitive. The auxiliary light source 32 at full illumination is bright enough to drive the light detector 30 into conduction 24 when there is no ambient light present to help bias the detector 30.

In the preferred embodiment, the light is transmitted by the signal transmitter 10 and the auxiliary light source 32, each a light emitting diode which operates only in the infrared wavelengths. A filter is disposed over the light detector 30 to reduce the occurrence of light at different wavelengths biasing the detector 30. The sum of all the light incident on the light receiver 16 is transformed into an equivalent electrical signal between the light detector 30 and the resistor 42. This signal is passed through the high pass filter consisting of the capacitor 40 to remove any noise present, including transient variations in ambient light such as those from fluorescent lamps and the like, and provides an output signal 38 containing information from the modulated light signal to the closure operator.

The signal output from the light detector 30 is also provided to the feedback circuit containing the auxiliary light source 32. The signal is first filtered by a low pass filter comprising a resistor 44 and a capacitor 46 to remove all the higher frequency components, leaving essentially a signal which describes the gradually varying ambient light along with the supplemental light from the auxiliary light source 32. After the signal is filtered, it is applied to the base of a transistor 48. As the ambient light increases, the voltage of the filtered signal increases at the base, and the transistor gradually begins to conduct current through the collector-emitter junction, slowly decreasing the current available to the auxiliary light source 32 and thus decreasing its light output. Conversely, as the ambient light decreases, the voltage of the filtered signal decreases at the base, and the transistor gradually stops conducting current through the collector-emitter junction, slowly increasing the current available to the auxiliary light source 32 and thus increasing its light output. As the ambient light decreases, the auxiliary light increases proportionally, and as the ambient light increases, the auxiliary light decreases proportionally. Accordingly, the underlying light intensity, apart from the modulated light signal 12 and the transient variations in ambient light, is held substantially constant.

This disclosure discusses only the preferred embodiment of the invention. There are several different ways of implementing the function of the invention. Therefore, the scope of this invention should not be limited to the embodiment as described herein, but by the spirit of the invention and the claims enumerated below.

What is claimed is:

1. A light beam obstacle detector for signalling the presence of an object in a defined area, the detector being subject to varying ambient light, comprising:

a light beam device including a transmitter disposed adjacent to the defined area for emitting a modulated light signal and a light receiver disposed adjacent to the defined area opposite the transmitter for generating a modulated electrical signal corresponding to the modulated light signal, the receiver being responsive to light above a light threshold level and below a saturation level so that the light signal alone is insufficient for detection by the receiver and the maximum expected ambient light combined with the received light signal is not great enough to saturate the receiver;

an auxiliary light source for illuminating the receiver to bias the receiver to respond to the light signal when the ambient light is below the light threshold level;

a closed loop circuit responsive to the modulated electrical signal for controlling the auxiliary light source to compensate for variations in ambient light and enable the receiver to respond to the light signal in any expected ambient light conditions.

2. The light beam obstacle detector of claim 1 wherein the detector operates in conjunction with a closure operator and the defined area is a closure opening.

3. The light beam obstacle detector of claim 1 wherein the auxiliary light source is a light emitting diode, and wherein the closed loop circuit for controlling the auxiliary light comprises a transistor to modulate the current available to the auxiliary light source.

4. The light beam obstacle detector of claim 3 additionally comprising a low pass filter to remove the received light signals and ambient noise from the closed loop circuit.

5. The light beam obstacle detector of claim 3 additionally comprising a high pass filter to allow only the modulated electrical signal corresponding to the received light signal to pass to further processing.

6. A method for automatically biasing a light beam obstacle detector for detecting the presence of an object in a defined area when the ambient light condition is variable comprising the steps of:

supplying current to an auxiliary light source to illuminate a light sensitive receiver;

transmitting a modulated light signal across a defined area;

receiving the auxiliary illumination, the modulated light signal, and the ambient light by the light sensitive receiver;

generating an electrical signal which corresponds to the light incident upon the receiver;

passing a frequency band of the electrical signal containing the information contained in the modulated light signal to an output;

passing low frequency components of the electrical signal generated by the receiver to a feedback circuit containing the auxiliary light source;

controlling the current available to the auxiliary light source, and indirectly the intensity of the auxiliary light source, in a manner inversely proportional to the amplitude of the low frequency components of the electrical signal generated by the receiver.

7. A method for automatically biasing a light beam obstacle detector responsive to interruption of the light beam wherein the detector is subject to variable ambient light conditions, comprising the steps of:

transmitting a modulated light beam to a receiver;

supplying bias light to the receiver;

generating an electrical signal corresponding to the sum of the modulated light beam, the bias light, and ambient light incident on the receiver;

passing a frequency band of the electrical signal containing the information in the modulated light beam to an output;

deriving a control signal from low frequency components of the electrical signal; and controlling the intensity of the bias light by the control signal to offset the effects of the ambient light.

8. The method as described in claim 7 wherein the receiver has an effective response to the modulated light beam where the total incident light is between a normal threshold level and a saturation level and wherein:

the step of controlling the intensity of the bias light comprises varying the bias light intensity to maintain the total incident light above the normal threshold level and less than the saturation level.

9. The method as described in claim 7 wherein the receiver has an effective response to the modulated light beam where the total incident light is between a threshold level and a saturation level and wherein:

the step of controlling the intensity of the bias light comprises varying the bias light intensity in inverse proportion to the incident ambient light.

* * * * *